(12) United States Patent
Albrecht

(10) Patent No.: US 11,259,511 B2
(45) Date of Patent: Mar. 1, 2022

(54) BRANCH FISHING ROD ASSEMBLY

(71) Applicant: Dustin Albrecht, Walkerton (CA)

(72) Inventor: Dustin Albrecht, Walkerton (CA)

( * ) Notice: Subject to any disclaimer, the term of this patent is extended or adjusted under 35 U.S.C. 154(b) by 271 days.

(21) Appl. No.: 16/522,307

(22) Filed: Jul. 25, 2019

(65) Prior Publication Data
US 2021/0022328 A1  Jan. 28, 2021

(51) Int. Cl.
*A01K 87/02* (2006.01)
*A01K 87/08* (2006.01)
*A01K 87/06* (2006.01)
*A01K 87/04* (2006.01)

(52) U.S. Cl.
CPC ........... *A01K 87/02* (2013.01); *A01K 87/04* (2013.01); *A01K 87/06* (2013.01); *A01K 87/08* (2013.01)

(58) Field of Classification Search
CPC ...... A01K 87/00; A01K 87/007; A01K 87/02; A01K 87/04; A01K 87/06; A01K 87/08; A01K 97/06
USPC ............... 43/18.1 R, 22, 23, 24, 25, 54.1; 206/315.11; 224/920
See application file for complete search history.

(56) References Cited

U.S. PATENT DOCUMENTS

| | | | | |
|---|---|---|---|---|
| 173,534 A * | 2/1876 | Endicott | ............... | A01K 87/00 43/25 |
| 734,544 A * | 7/1903 | Hall | ............... | A01K 87/00 43/25 |
| 887,437 A * | 5/1908 | Smith | ............... | A01K 87/06 43/22 |
| 1,952,789 A * | 3/1934 | Butts | ............... | E04H 12/2215 248/533 |
| 2,659,544 A * | 11/1953 | Freeman | ............... | A01K 87/06 242/322 |
| 2,793,458 A * | 5/1957 | Stephens | ............... | A01K 87/02 43/22 |
| 2,810,982 A * | 10/1957 | Bucciarelli | ............... | A01K 91/02 43/25 |
| 3,216,144 A * | 11/1965 | Vojinov | ............... | A01K 87/00 43/18.1 R |
| 3,367,056 A * | 2/1968 | Johnson | ............... | A01K 87/08 43/25 |
| 3,533,181 A * | 10/1970 | Kniskern | ............... | A01K 87/00 43/25 |
| 3,885,752 A * | 5/1975 | Noffsinger | ............... | B65H 75/406 242/395 |
| 4,860,485 A | 8/1989 | Rhoton | | |
| 5,317,829 A * | 6/1994 | Balkcom | ............... | A01K 87/08 43/22 |

(Continued)

*Primary Examiner* — Darren W Ark
*Assistant Examiner* — Katelyn T Truong

(57) ABSTRACT

A branch fishing rod assembly for creating a fishing rod out of a branch or stick includes a reel holder apparatus, a reel, and a plurality of eyelet apparatuses. The reel holder apparatus comprises a holder body and a pair of holder clamps coupled to the holder body to secure the holder body to a branch or a stick. The reel is selectively engageable within a reel opening of the holder body. The plurality of eyelet apparatuses each comprises an eyelet clamp to selectively engage the branch or the stick. An attachment arm is coupled to the eyelet clamp strap and an eyelet is coupled to the attachment arm. The reel is configured to secure a fishing line and the plurality of eyelet apparatuses is configured to receive the fishing line through each eyelet.

10 Claims, 4 Drawing Sheets

(56) References Cited

U.S. PATENT DOCUMENTS

| | | | | |
|---|---|---|---|---|
| 5,655,328 | A * | 8/1997 | Childs | A01K 87/085 |
| | | | | 219/535 |
| 5,962,817 | A * | 10/1999 | Rodriguez | G01G 19/60 |
| | | | | 177/126 |
| 6,269,583 | B1 * | 8/2001 | Tashchyan | A01K 85/14 |
| | | | | 43/4 |
| 7,363,783 | B2 * | 4/2008 | Kolton | A01K 87/06 |
| | | | | 206/315.11 |
| 8,079,172 | B2 * | 12/2011 | Dudney | A01K 97/08 |
| | | | | 43/4.5 |
| 8,819,899 | B2 * | 9/2014 | Fietkiewicz | F16L 33/085 |
| | | | | 24/274 R |
| 9,032,592 | B2 * | 5/2015 | Fritskey | F16L 33/04 |
| | | | | 24/274 R |
| 10,772,311 | B1 * | 9/2020 | Ashikaga | A01K 87/06 |
| 2002/0104560 | A1 | 8/2002 | Kelley | |
| 2005/0155275 | A1 * | 7/2005 | Keksi | A01K 97/06 |
| | | | | 43/54.1 |
| 2006/0230669 | A1 | 10/2006 | Markley | |
| 2011/0271580 | A1 | 11/2011 | Carse | |
| 2014/0130397 | A1 | 5/2014 | Annandale | |
| 2016/0368731 | A1 * | 12/2016 | Dam | B65H 75/22 |
| 2020/0068862 | A1 * | 3/2020 | Omura | A01K 87/002 |

\* cited by examiner

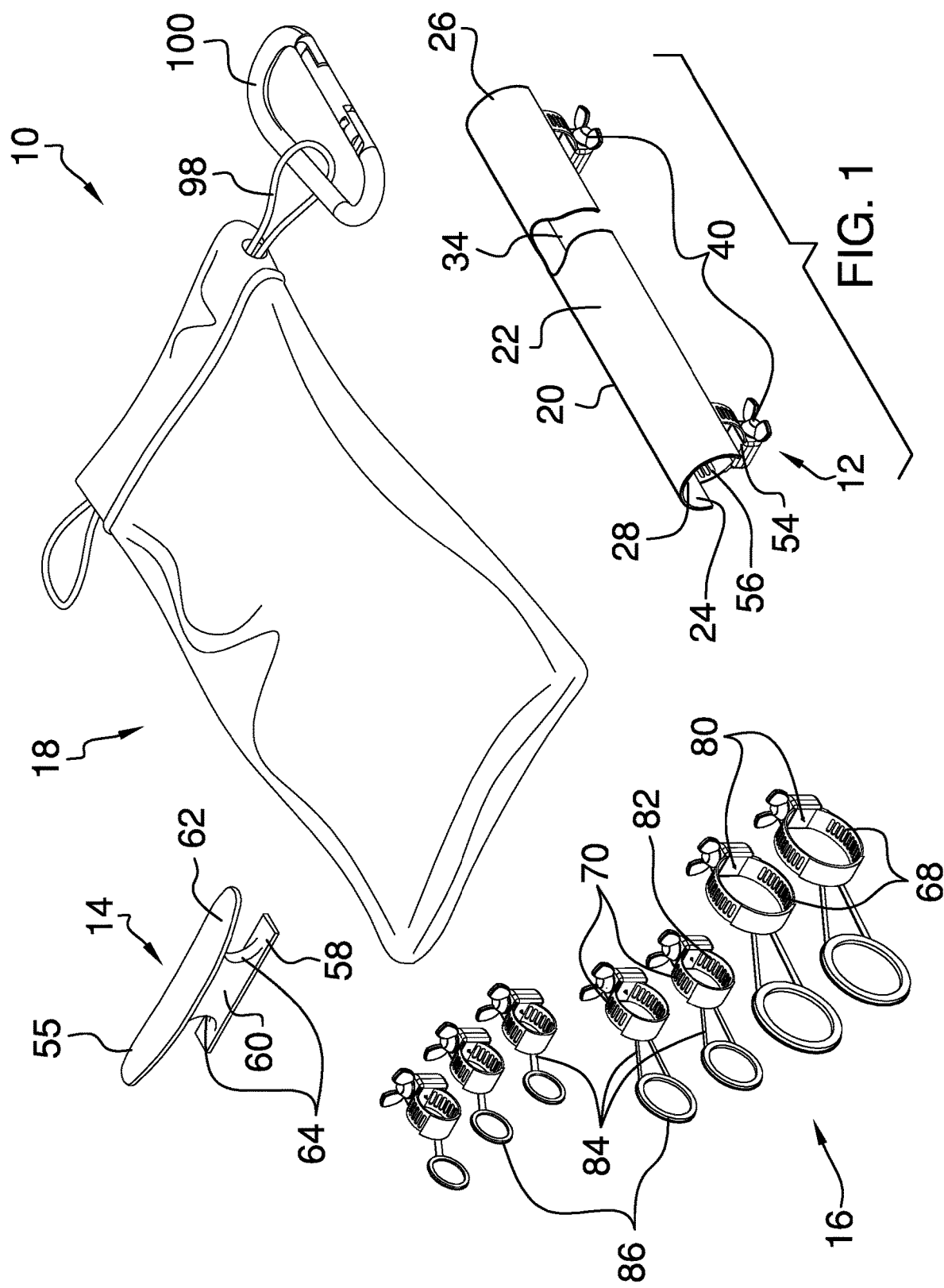

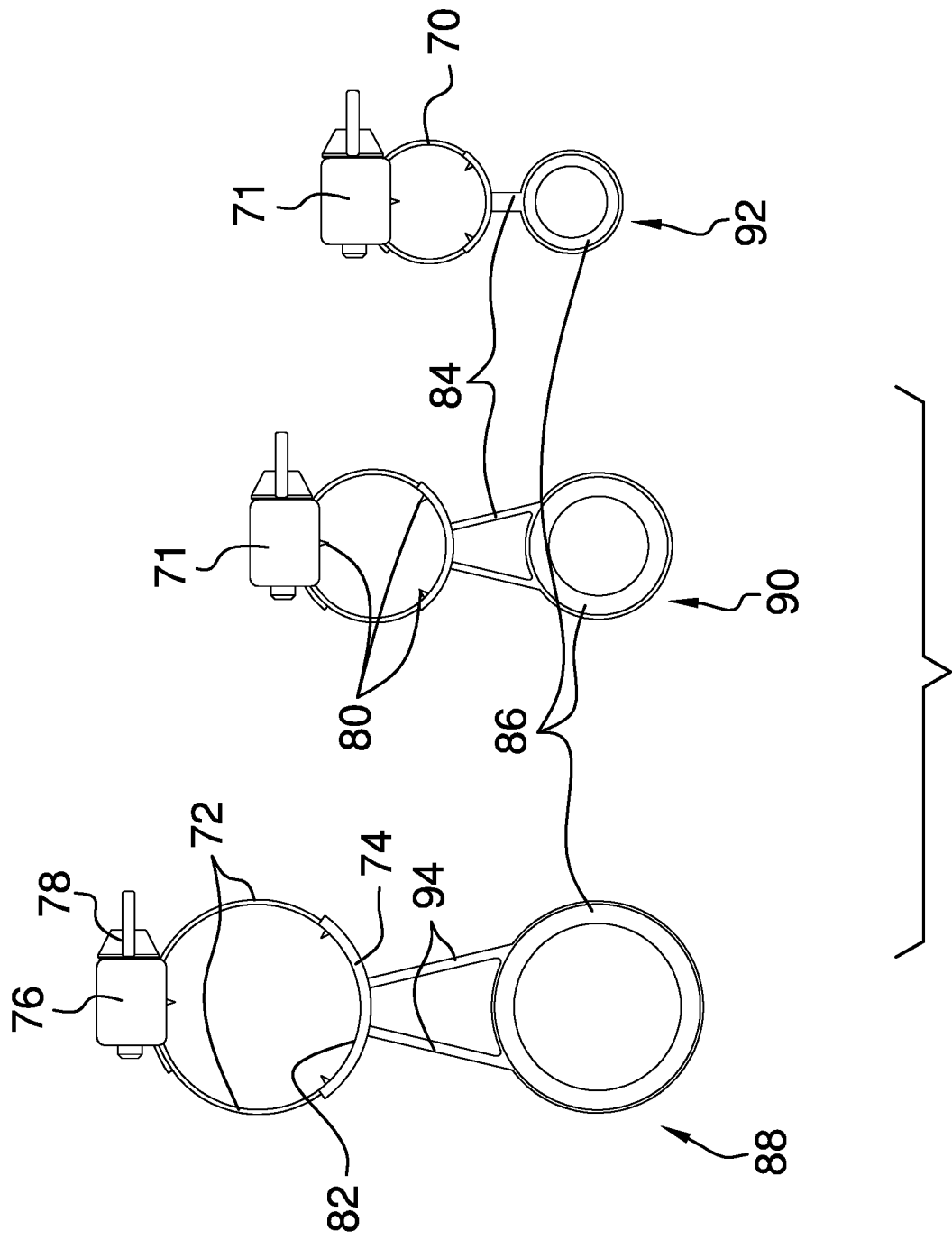

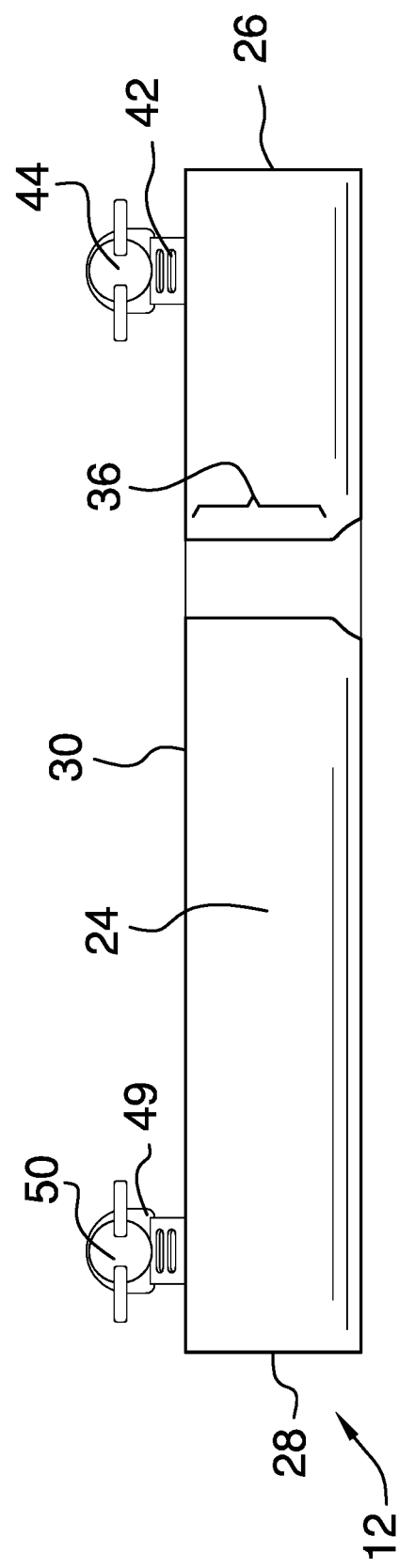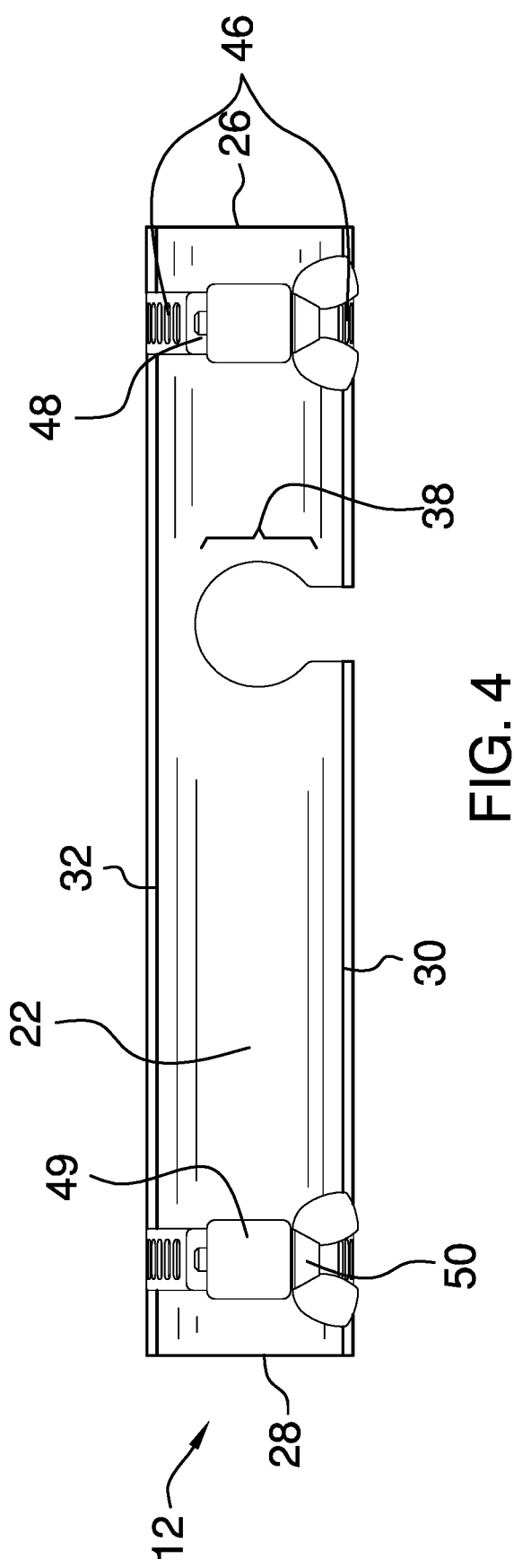

BRANCH FISHING ROD ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to fishing equipments and more particularly pertains to a new fishing equipment for creating a fishing rod out of a branch or stick.

BRIEF SUMMARY OF THE INVENTION

An embodiment of the disclosure meets the needs presented above by generally comprising a reel holder apparatus, a reel, and a plurality of eyelet apparatuses. The reel holder apparatus comprises a semi-cylindrical holder body having an outer surface, an inner surface, a top edge, a bottom edge, a right edge, and a left edge. The holder body has a reel opening extending from the outer surface through the inner surface. A pair of holder clamps is coupled to the holder body. Each of the pair of holder clamps has a holder clamp strap extending from the right edge to the left edge and a holder clamp adjustment mechanism coupled to the holder clamp strap to tighten and alternatively loosen the holder clamp strap. The pair of holder clamp straps is configured to secure the holder body to a branch or a stick. The reel is selectively engageable within the reel opening of the holder body. The plurality of eyelet apparatuses each comprises an eyelet clamp having an eyelet clamp strap and an eyelet clamp adjustment mechanism coupled to the eyelet clamp strap to tighten and alternatively loosen the eyelet clamp strap. The eyelet clamp is configured to selectively engage the branch or the stick. An attachment arm is coupled to the eyelet clamp strap and an eyelet is coupled to the attachment arm. The reel is configured to secure a fishing line and the plurality of eyelet apparatuses is configured to receive the fishing line through each eyelet.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 1 is an isometric view of a branch fishing rod assembly according to an embodiment of the disclosure.

FIG. 2 is a front elevation view of an embodiment of the disclosure.

FIG. 3 is a side elevation view of an embodiment of the disclosure.

FIG. 4 is a top plan view of an embodiment of the disclosure.

DETAILED DESCRIPTION OF THE INVENTION

Figure 5:
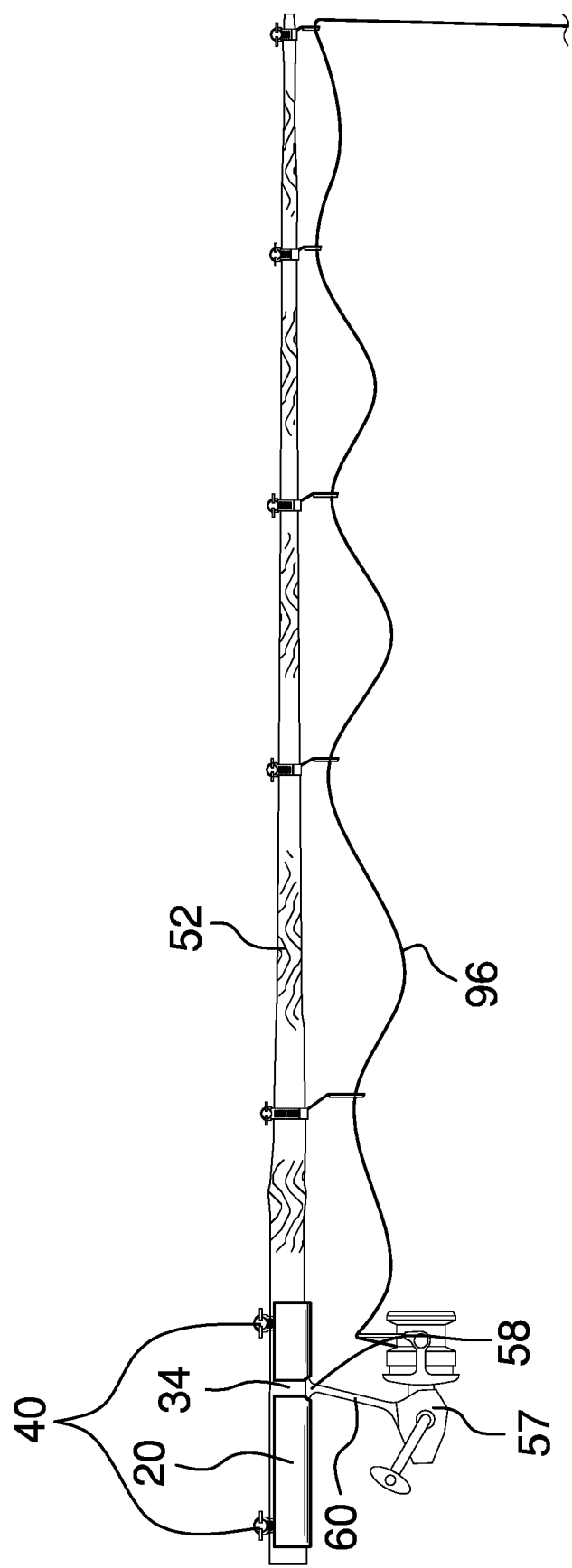
FIG. 5 is a side view of an embodiment of the disclosure.

With reference now to the drawings, and in particular to FIGS. 1 through 5 thereof, a new fishing equipment embodying the principles and concepts of an embodiment of the disclosure and generally designated by the reference numeral 10 will be described.

As best illustrated in FIGS. 1 through 5, the branch fishing rod assembly 10 generally comprises a reel holder apparatus 12, a reel 14, a plurality of eyelet apparatuses 16, and a carrying pouch 18. The reel holder apparatus 12 comprises a semi-cylindrical holder body 20 having an outer surface 22, an inner surface 24, a top edge 26, a bottom edge 28, a right edge 30, and a left edge 32. The holder body 20 has a reel opening 34 extending from the outer surface 22 through the inner surface 24. The reel opening 34 comprises a channel portion 36 extending from the right edge 30 and an aperture portion 38 medially located between the right edge 30 and the left edge 32. The aperture portion 38 has a diameter greater than a width of the channel portion 36. A pair of holder clamps 40 is coupled to the holder body 20. Each of the pair of holder clamps 40 has a holder clamp strap 42 extending from the right edge 20 to the left edge 32 and a holder clamp adjustment mechanism 44 coupled to the holder clamp strap 42 to tighten and alternatively loosen the holder clamp strap 42. Each of the holder clamps 40 may be a fly nut clamp with the holder clamp straps 42 having a pair of holder slotted portions 46 and a medial holder smooth portion 48 between the pair of holder slotted portions 46. Each of the holder clamp adjustment mechanisms 44 has a holder clamp housing 49 and a holder fly nut 50 coupled to the holder clamp housing 49. The pair of holder clamp straps 42 is configured to secure the holder body 20 to a branch 52 or a stick. A plurality of holder grip spikes 54 is coupled to a holder inner face 56 of each holder clamp 40. The plurality of holder grip spikes 54 may comprise two holder grip spikes 54 coupled to the holder smooth portion 48 and one holder grip spike 54 coupled to the holder clamp housing 49.

The reel 14 may be a nautical type reel 55 or another type of standard fishing reel including, but not limited to, a spinning wheel 57, a baitcasting reel, a spincast reel, or the like. The reel 14 has a rectangular foot 58, an extension portion 60 coupled to the rectangular foot 58, and a cleat 62 coupled to the extension portion 60. The foot 58 is selectively engageable within the reel opening 34 of the holder body 20. The extension portion 60 has a pair of concave sides 64 and the cleat 62 is ellipsoidal.

Each of the plurality of eyelet apparatuses 16 comprises an eyelet clamp 68 having an eyelet clamp strap 70 and an eyelet clamp adjustment mechanism 71 coupled to the eyelet clamp strap 70 to tighten and alternatively loosen the eyelet clamp strap 70. Each of the eyelet clamps 68 may be a fly nut clamp with the eyelet clamp strap 70 having a pair of eyelet slotted portions 72 and a medial eyelet smooth portion 74 between the pair of eyelet slotted portions 72. Each of the eyelet clamp adjustment mechanisms 71 has an eyelet clamp housing 76 and an eyelet fly nut 78 coupled to the eyelet clamp housing 76. The eyelet clamp 68 is configured to selectively engage the branch 52 or the stick. A plurality of eyelet grip spikes 80 is coupled to an eyelet inner face 82 of each eyelet clamp. The plurality of eyelet grip spikes 80 may comprise two eyelet grip spikes 80 coupled to the eyelet smooth portion 74 and one eyelet grip spike 80 coupled to the eyelet clamp housing 76. An attachment arm 84 is coupled to the eyelet smooth portion 74 of the eyelet clamp strap and an eyelet 86 is coupled to the attachment arm 84. The plurality of eyelet apparatuses 16 may comprising a pair of large eyelet apparatuses 88, a pair of medium eyelet apparatuses 90, and a set of three small eyelet apparatuses 92. The attachment arm 84 of each of the large eyelet apparatuses 88 and each of the medium eyelet apparatuses 90 comprises a pair of arms 94. The pair of arms 94 is arranged such that a distance between the pair of arms increases from the eyelet clamp 68 to the eyelet 86.

The reel 14 is configured to secure a fishing line 96 and the plurality of eyelet apparatuses 16 is configured to receive the fishing line 96 through each eyelet 86. The carrying pouch 18 has a cinch loop 98 and a carabiner 100 coupled to the cinch loop 98. The carrying pouch 18 selectively receives the reel holder apparatus 12, the reel 14, and the plurality of eyelet apparatuses 16.

In use, the reel 14 is engaged within the reel opening 34 of the holder body 20 and the holder clamps 40 are engaged to the branch 52. The eyelet clamp 68 of each of the eyelet apparatuses 16 is engaged to the branch 52 and the fishing line 96 is fed from the reel 14 through each eyelet 86. Bait, weights, lures or the like are attached to the fishing line 96 and the assembly 10 is used with the branch 52 as a traditional fishing pole.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A branch fishing rod assembly comprising: a reel holder apparatus, the reel holder apparatus comprising:
   a holder body, the holder body being semi-cylindrical and having an outer surface, an inner surface, a top edge, a bottom edge, a right edge, and a left edge, the holder body having a reel opening extending from the outer surface through the inner surface; and
   a pair of holder clamps coupled to the holder body, each of the pair of holder clamps having a holder clamp strap extending from the right edge to the left edge and a holder clamp adjustment mechanism coupled to the holder clamp strap to tighten and alternatively loosen the holder clamp strap, the holder clamp strap of each of the pair of holder clamps being configured to secure the holder body to a branch or a stick;
   a reel, the reel being selectively engageable within the reel opening of the holder body, the reel being a nautical type reel having a rectangular foot, an extension portion coupled to the rectangular foot, and a cleat coupled to the extension portion, the foot being selectively engageable within the reel opening of the holder body;
   a plurality of eyelet apparatuses, each of the plurality of eyelet apparatuses comprising:
      an eyelet clamp, the eyelet clamp having an eyelet clamp strap and an eyelet clamp adjustment mechanism coupled to the eyelet clamp strap to tighten and alternatively loosen the eyelet clamp strap, the eyelet clamp being configured to selectively engage the branch or the stick;
      an attachment arm coupled to the eyelet clamp, the attachment arm being coupled to the eyelet clamp strap; and
      an eyelet coupled to the attachment arm;
   wherein the reel is configured to secure a fishing line and the plurality of eyelet apparatuses is configured to receive the fishing line through each eyelet;
   each of the pair of holder clamps and the eyelet clamp of each of the plurality of eyelet apparatuses being fly nut clamps, the eyelet clamp strap of each of the plurality of eyelet apparatuses having a pair of eyelet slotted portions and a medial eyelet smooth portion between the pair of eyelet slotted portions, and the holder clamp strap of each of the pair of holder clamps having a pair of holder slotted portions and a medial holder smooth portion between the pair of holder slotted portions, the holder clamp adjustment mechanism of each of the pair of holder clamps having a holder clamp housing and a holder fly nut coupled to the holder clamp housing, the eyelet clamp adjustment mechanism of each of the plurality of eyelet apparatuses having an eyelet clamp housing and an eyelet fly nut coupled to the eyelet clamp housing, the attachment arm being coupled to the medial eyelet smooth portion; and
   the reel opening comprising a channel portion extending from the right edge and an aperture portion medially located between the right edge and the left edge, the aperture portion having a diameter greater than a width of the channel portion.

2. The branch fishing rod assembly of claim 1 further comprising the extension portion having a pair of concave sides and the cleat being ellipsoidal.

3. The branch fishing rod assembly of claim 1 further comprising a plurality of eyelet grip spikes coupled to an eyelet inner face of the eyelet clamp of each of the plurality of eyelet apparatuses and a plurality of holder grip spikes coupled to a holder inner face of each of the pair of holder clamps.

4. The branch fishing rod assembly of claim 2 further comprising the plurality of eyelet grip spikes comprising two eyelet grip spikes coupled to the medial eyelet smooth portion and one eyelet grip spike coupled to the eyelet clamp housing, the plurality of holder grip spikes comprising two holder grip spikes coupled to a holder smooth portion and one holder grip spike coupled to the holder clamp housing.

5. The branch fishing rod assembly of claim 1 further comprising the plurality of eyelet apparatuses comprising a pair of large eyelet apparatuses, a pair of medium eyelet apparatuses, and a set of three small eyelet apparatuses, the attachment arm of each of the large eyelet apparatuses and each of the medium eyelet apparatuses comprising a pair of arms.

6. The branch fishing rod assembly of claim 5 further comprising the pair of arms being arranged such that a distance between the pair of arms increases from the eyelet clamp to the eyelet.

7. The branch fishing rod assembly of claim 1 further comprising the reel being a spinning reel.

8. The branch fishing rod assembly of claim 1 further comprising a carrying pouch, the carrying pouch selectively receiving the reel holder apparatus, the reel, and the plurality of eyelet apparatuses.

9. The branch fishing rod assembly of claim 8 further comprising the carrying pouch having a cinch loop and a carabiner coupled to the cinch loop.

10. A branch fishing rod assembly comprising: a reel holder apparatus, the reel holder apparatus comprising:
   a holder body, the holder body being semi-cylindrical and having an outer surface, an inner surface, a top edge, a bottom edge, a right edge, and a left edge, the holder body having a reel opening extending from the outer surface through the inner surface, the reel opening comprising a channel portion extending from the right edge and an aperture portion medially located between the right edge and the left edge, the aperture portion having a diameter greater than a width of the channel portion;
   a pair of holder clamps coupled to the holder body, each of the pair of holder clamps having a holder clamp strap extending from the right edge to the left edge and a holder clamp adjustment mechanism coupled to the holder clamp strap to tighten and alternatively loosen the holder clamp strap, each of the pair of holder clamps being fly nut clamps, the holder clamp strap of each of the pair of holder clamps having a pair of holder slotted portions and a medial holder smooth portion between the pair of holder slotted portions, the holder clamp adjustment mechanism of each of the pair of holder clamps having a holder clamp housing and a holder fly nut coupled to the holder clamp housing, the holder clamp strap of each of the pair of holder clamps being configured to secure the holder body to a branch or a stick; and
   a plurality of holder grip spikes coupled to a holder inner face of each of the pair of holder clamps, the plurality of holder grip spikes comprising two holder grip spikes coupled to a holder smooth portion and one holder grip spike coupled to the holder clamp housing;
   a reel, the reel being a nautical type reel having a rectangular foot, an extension portion coupled to the rectangular foot, and a cleat coupled to the extension portion, the foot being selectively engageable within the reel opening of the holder body, the extension portion having a pair of concave sides and the cleat being ellipsoidal;
   a plurality of eyelet apparatuses, each of the plurality of eyelet apparatuses comprising:
   an eyelet clamp, the eyelet clamp having an eyelet clamp strap and an eyelet clamp adjustment mechanism coupled to the eyelet clamp strap to tighten and alternatively loosen the eyelet clamp strap, the eyelet clamp of each of the plurality of eyelet apparatuses being fly nut clamps, the eyelet clamp strap of each of the plurality of eyelet apparatuses having a pair of eyelet slotted portions and a medial eyelet smooth portion between the pair of eyelet slotted portions, the eyelet clamp adjustment mechanism of each of the plurality of eyelet apparatuses having an eyelet clamp housing and an eyelet fly nut coupled to the eyelet clamp housing, the eyelet clamp being configured to selectively engage the branch or the stick;
   a plurality of eyelet grip spikes coupled to an eyelet inner face of the eyelet clamp of each of the plurality of eyelet apparatuses, the plurality of eyelet grip spikes comprising two eyelet grip spikes coupled to the medial eyelet smooth portion and one eyelet grip spike coupled to the eyelet clamp housing;
   an attachment arm coupled to the eyelet clamp, the attachment arm being coupled to the medial eyelet smooth portion of the eyelet clamp strap; and
   an eyelet coupled to the attachment arm;
   the plurality of eyelet apparatuses comprising a pair of large eyelet apparatuses, a pair of medium eyelet apparatuses, and a set of three small eyelet apparatuses, the attachment arm of each of the large eyelet apparatuses and each of the medium eyelet apparatuses comprising a pair of arms, the pair of arms being arranged such that a distance between the pair of arms increases from the eyelet clamp to the eyelet;
   wherein the reel is configured to secure a fishing line and the plurality of eyelet apparatuses is configured to receive the fishing line through each eyelet; and
   a carrying pouch, the carrying pouch having a cinch loop and a carabiner coupled to the cinch loop, the carrying pouch selectively receiving the reel holder apparatus, the reel, and the plurality of eyelet apparatuses.

\* \* \* \* \*